United States Patent [19]
Putnam

[11] Patent Number: 5,288,094
[45] Date of Patent: Feb. 22, 1994

[54] BRACKET FOR SUPPLYING AN ELECTRICAL CONNECTOR

[76] Inventor: Rex D. Putnam, 239 Sherman St., Bronson, Mich. 49028

[21] Appl. No.: 966,529

[22] Filed: Oct. 23, 1992

[51] Int. Cl.⁵ .............................................. B60D 1/64
[52] U.S. Cl. .................................... 280/420; 248/214; 280/422; 439/35; 439/527; D7/619; D8/354
[58] Field of Search .......................... 439/34, 35, 527; 248/214; 280/420, 421, 422; D7/619; D8/354

[56] References Cited

U.S. PATENT DOCUMENTS

| | | |
|---|---|---|
| D. 223,082 | 3/1972 | Fromm . |
| D. 324,990 | 3/1992 | Gary . |
| 950,361 | 2/1910 | Woons ................... 248/214 |
| 1,068,391 | 7/1913 | Jensen .................. 248/214 |
| 2,436,533 | 2/1948 | Thompson . |
| 2,730,183 | 1/1956 | Svoboda . |
| 3,127,114 | 3/1964 | Shaw . |
| 3,307,710 | 3/1967 | Negri ..................... 248/214 |
| 3,497,707 | 2/1970 | Stewart . |
| 3,915,476 | 10/1975 | Burkle . |
| 4,883,433 | 11/1989 | Lane . |

Primary Examiner—Mitchell J. Hill
Attorney, Agent, or Firm—Ian C. McLeod

[57] ABSTRACT

A bracket 12 for mounting an electrical connector 28 to a trailer hitch assembly 10 is described. The bracket 12 is formed from a single sheet of material which is bent at two 90° angles L1 and L2 to form a top section 12C and a first extension 12A and a second extension 12B. The top section 12C with the two extensions 12A and 12B have a U-shape which conforms with a hitch bar 22 having a rectangular or square cross-section on a trailer hitch assembly 10. The first and second extensions 12A and 12B are provided with securing holes 20 through which a nut and bolt assembly 18 is inserted to secure the bracket 12 to the hitch bar 22. The second extension 12B extends beyond the bottom 22B of the hitch bar 22 and has an aperture 14 through which an electrical connector 28 is mounted.

12 Claims, 1 Drawing Sheet

BRACKET FOR SUPPLYING AN ELECTRICAL CONNECTOR

BACKGROUND OF THE INVENTION

(1) Field of the Invention

The present invention relates to a bracket for mounting an electrical connector to a trailer hitch assembly. In particular, the present invention relates to a bracket for mounting an electrical connector to a trailer hitch assembly wherein the bracket has a U-shaped section to fit over the trailer hitch which has a rectangular or square cross-section and extensions which extend past the hitch and are connected by bolts to secure the bracket to the hitch.

(2) Prior Art

The prior art has shown various brackets some with a U-shaped construction as a method of attachment. U.S. Pat. No. Des. 324,990 to Gary describes a light support bracket with a U-shaped end.

U.S. Pat. No. Des. 223,082 to Fromm describes a bracket for automotive condensers which has an L-shaped construction.

U.S. Pat. No. 2,436,533 to Thompson describes a door hook with a hook-jaw at one end which fits over the door such that the teeth on the hook-jaw penetrate into the top edge of the door to secure the hook to the door.

U.S. Pat. No. 3,127,114 to Shaw describes a light fixture which employs a clip. The clip portion has a hook which is adapted to slip over the top of the back plate of the music rack. The depending leg portion of the clip may be bent inwardly to provide a spring-like grip to frictionally secure the clip to the back plate of the music rack.

Other prior art which is less relevant to the present invention includes U.S. Pat. No. 2,730,183 to Svoboda; U.S. Pat. No. 3,497,707 to Stewart; U.S. Pat. No. 3,915,476 to Burkle and U.S. Pat. No. 4,883,433 to Lane.

Although, the U-shaped hook attaches the bracket onto the device for which it is secured, the vibration and excessive movement involved in the use of a trailer hitch assembly would render such a force fit inadequate. Additionally, due to the metal construction of most trailer hitches, it is not realistic to attempt to secure the bracket by attaching the bracket directly into the trailer hitch as this would involve some means of puncturing the metal hitch. Therefore, there remains a need for a bracket for use on trailer hitch assembly which is easy to mount and yet secure so as to withstand the vibration of the vehicle and which will not damage the trailer hitch assembly to which it is mounted.

OBJECTS

It is therefore an object of the present invention to provide an electrical connector bracket which can be easily mounted to a trailer hitch. It is further an object of the present invention to provide a method of attachment of an electrical connector to a trailer hitch which is easy to attach, which will not damage trailer hitch and which is able to be attached to endure the vibration and excessive movement of a trailer hitch assembly. Still further, it is an object of the invention to provide an improved bracket for mounting an electrical connector on a hitch assembly where the bracket is U-shaped to fit over the trailer hitch and wherein bolts extend through the extensions of the bracket to secure the bracket onto the trailer hitch. Still further, an object of the patent to provide a method of mounting an electrical connector in an easy and consistent manner directly to the trailer hitch rather than searching for a mounting location on the vehicle itself as prior art requires. It is still further an object of the patent to provide an inexpensive bracket for mounting an electrical connector onto a trailer hitch which is easy to manufacture and yet durable. These and other objects will become increasingly apparent by reference to the following descriptions and to the drawings.

IN THE DRAWINGS

FIG. 1 is a separated perspective view of the bracket 12 with the nut and bolt assembly 18.

FIG. 2 is a front perspective view of the bracket 12 mounted onto a trailer hitch assembly 10 which is in turn mounted on the vehicle frame 100 (dotted lines).

FIG. 3 is a cross-sectional view along the line 3—3 of FIG. 2 showing the bracket 12 mounted onto the hitch bar 22 by the nut and bolt assembly 18 with the electrical connector 28 attached.

GENERAL DESCRIPTION

The present invention relates to a bracket for mounting an electrical connector to a trailer hitch with a hitch bar with an essentially rectangular or square cross-section and which extends across the rear of a vehicle which comprises: a hook shaped plate having a U-shaped section conforming to the cross-section of the hitch bar and having a short extension which extends downward from the hitch bar and a long extension spaced from the short extension which extends downward from the hitch bar; wherein the long extension is provided with an opening for mounting the electrical connector; and securing means extending between the extensions to hold the plate on the hitch bar.

Further, the present invention relates to a hitch assembly mounted on a vehicle, the hitch including a hitch bar with an essentially rectangular or square cross-section which extends across the rear of a vehicle, the improvement for mounting an electrical connector on the hitch assembly which comprises: a bracket for mounting an electrical connector to a trailer hitch with a hitch bar with an essentially rectangular or square cross-section extending across the rear of a vehicle which comprises: a hook shaped plate having a U-shaped section conforming to the cross-section of the hitch bar and having a short extension which extends downward from the hitch bar and a long extension spaced from the short extension which extend downward from the hitch bar; wherein the long extension is provided with an opening for mounting the electrical connector; and securing means extending between the extensions to hold the plate on the hitch bar; and an electrical connector mounted through the opening in the bracket.

DETAILED DESCRIPTION

Figure 1:
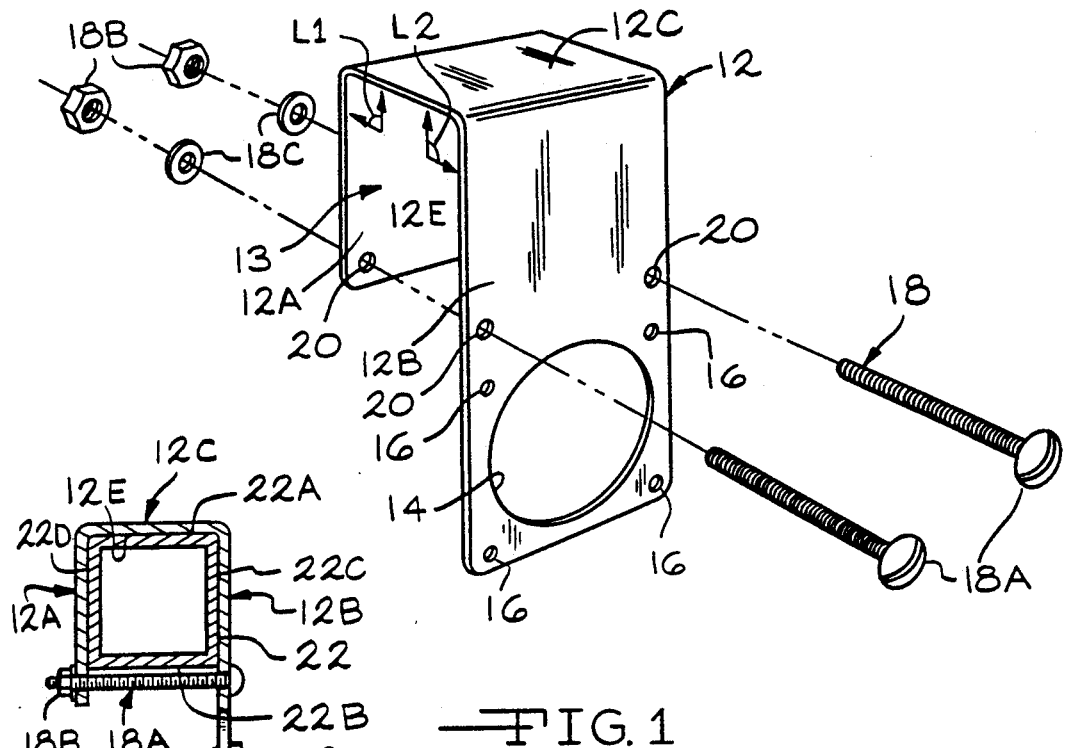
Figure 3:
Figure 2:
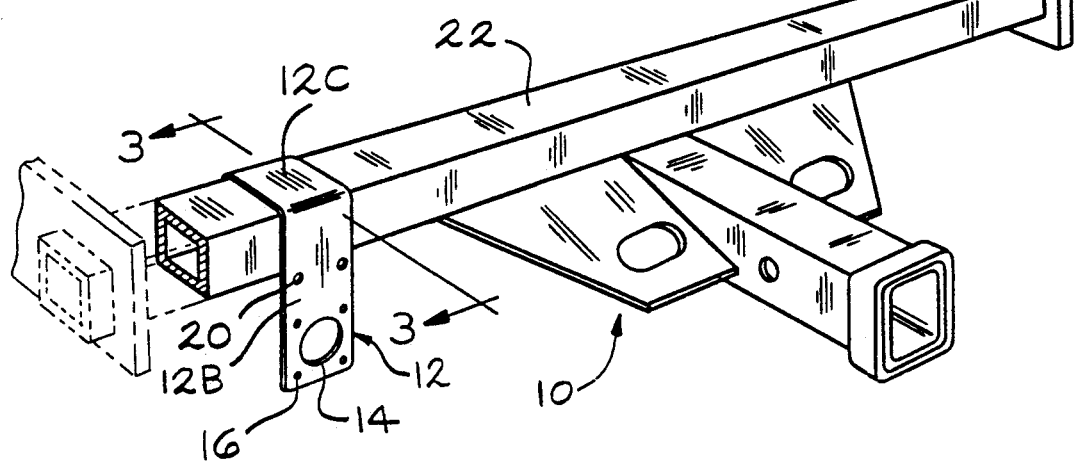

FIGS. 1 to 3, show a bracket 12 mounted on a trailer hitch assembly 10. As shown particularly in FIG. 1, the bracket 12 is preferably formed from a flat unitary sheet of material. The bracket 12 is bent at two 90° angles L1 and L2 such that a top section 12C and a first extension 12A and second extension 12B are formed. The first extension 12A and second extension 12B are parallel and extend downward from the top section 12C, such that the top section 12C and the extensions 12A and 12B form a U-shaped hook 13 with an inner surface 12E.

The first and second extensions 12A and 12B have corresponding pairs of securing holes 20 through which fit bolts 18A with nuts 18B for securing the bracket 12 onto the trailer hitch assembly 10 as described in detail hereinafter. The bolts 18A are preferably inserted first into the securing hole 20 in the second extension 12B through the space 13 of the bracket 12 to the first extension 12A where a washer 18C and nut 18B are attached.

The first extension 12A is shorter in length than the second extension 12B and is preferably only of a length to easily accommodate the securing holes 20. The second extension 12B is provided with an aperture 14 in the end opposite the top section 12C in the plane perpendicular to the top section 12C. The aperture 14 in the second extension 12B is located beyond the length of the first extension 12A. Therefore, when the electrical connector 28 is inserted into the aperture 14 in the second extension 12B (FIG. 3) the electrical connector 28 will not come in contact with the first extension 12A. The second extension 12B is also provided with attachment holes 16 which are located around the outer perimeter of the aperture 14 in order to provide a method of securing the electrical connector 28 to the second extension 12B.

IN USE

As shown in FIG. 2, the bracket 12 is mounted onto a trailer hitch assembly 10 which is mounted onto a vehicle frame 100. The trailer hitch assembly 10 has a hitch bar 22 which is preferably rectangular or square in cross-section having a top 22A and bottom 22B with a front side 22C and a back side 22D formed parallel there between. The spacing of the bracket 12 between the extensions 12A and 12B is such that the U-shaped hook 13 of the bracket 12 fits securely over the hitch bar 22. The bracket 12 is mounted on the hitch bar 22 such that the inside of the top section 12C is adjacent to the top 22A of the hitch bar 22. In the preferred embodiment, the extensions 12A and 12B of the bracket 12 extend down on either side of the hitch bar 22 with the inside of the first extension 12A adjacent the back side 22D of the hitch bar 22 and the inside of the second extension 12B adjacent the front side 22C of the hitch bar 22 (FIG. 3). The first extension 12A extends to a point just below the bottom 22B of the hitch bar 22 such that the securing holes 20 are located immediately below the bottom 22B of the hitch bar 22. The second extension 12B extends below the hitch bar 22 such that the securing holes 20 are below the bottom 22B of the hitch bar 22 directly opposite the securing holes 20 in the first extension 12A and the aperture 14 and related attachment holes 16 are completely clear of the hitch bar 22.

FIG. 3 is a cross-section of the bracket 12 secured onto the trailer hitch assembly 10 by the nut and bolt assembly 18. The electrical connector 28 is mounted through the aperture 14 and attached by fasteners 30, such as nuts and bolts, extending through the attachment holes 16. As can be seen by FIG. 3, the securing holes 20 are just beneath the hitch bar 22 such that the nut and bolt assembly can be inserted and can secure the bracket 12 onto the hitch bar 22 with no interference with the electrical connector 28.

It is intended that the foregoing description be only illustrative of the present invention and that the present invention be limited only by the hereinafter appended claims.

I claim:

1. A bracket for mounting an electrical connector to a trailer hitch with a hitch bar with an essentially rectangular cross-section and which extends across the rear of a vehicle which comprises:
    (a) a hook shaped plate having a U-shaped section conforming to the cross-section of the hitch bar and having a short extension which extends downward beyond the hitch bar and a long extension spaced from the short extension which extends downward beyond the hitch bar and the short extension; wherein the long extension is provided with an opening for mounting the electrical connector; and
    (b) securing means extending between the short extension and the long extension beneath the hitch bar for holding the plate on the hitch bar.

2. The bracket of claim 1 wherein the securing means is at least one bolt extension and the long extension and between the short extension and the long extension with a nut on the bolt for holding the bracket on the hitch bar.

3. The bracket of claim 1 wherein the securing means is provided between the short extension and the long extension adjacent to the hitch bar.

4. The bracket of claim 3 wherein the securing means is a bolt extending through openings in the short extension and the long extension between the short extension and the long extension with a nut on the bolt for holding the bracket on the hitch bar.

5. In a trailer hitch assembly to be mounted on a vehicle, the hitch including a hitch bar with an essentially rectangular cross-section which extends across the rear of a vehicle, the improvement for mounting an electrical connector on the hitch assembly which comprises:
    (a) a bracket for mounting an electrical connector to a trailer hitch with a hitch bar with an essentially rectangular cross-section extending across the rear of a vehicle which comprises: a hook shaped plate having a U-shaped section conforming to the cross-section of the hitch bar and having a short extension which extends downward from the hitch bar and a long extension spaced from the short extension which extends downward from the hitch bar; wherein the long extension is provided with an opening for mounting the electrical connector; and securing means extending between the short extension and the long extension for holding the plate on the hitch bar; and
    (b) an electrical connector mounted through the opening in the bracket.

6. The hitch assembly of claim 5 wherein the securing means is at least one bolt extending through openings in the short extension and the long extension and between the short extension and the long extension with a nut on the bolt for holding the bracket on the hitch bar.

7. The hitch assembly of claim 5 wherein the securing means is provided between the short extension and the long extension adjacent to the hitch bar.

8. The hitch assembly of claim 7 wherein the securing means is a bolt extending through openings in the short extension and the long extension between the short extension and the long extension with a nut on the bolt for holding the bracket on the hitch bar.

9. In a hitch assembly mounted on a vehicle, the hitch including a hitch bar with an essentially rectangular cross-section which extends across the rear of a vehicle, the improvement for mounting an electrical connector on the hitch assembly which comprises:

(a) a bracket for mounting an electrical connector to a trailer hitch with a hitch bar with an essentially rectangular cross-section extending across the rear of a vehicle which comprises: a hook shaped plate having a U-shaped section conforming to the cross-section of the hitch bar and having a short extension which extends downward from the hitch bar and a long extension spaced from the short extension which extend downward from the hitch bar; wherein the long extension is provided with an opening for mounting the electrical connector; and securing means extending between the short extension and the long extension for holding the plate on the hitch bar; and (b) an electrical connector mounted through the opening in the bracket.

10. In a hitch assembly of claim 9 wherein the securing means is at least one bolt extending through openings in the short extension and the long extension and between the short extension and the long extension with a nut on the bolt for holding the bracket on the hitch bar.

11. In a hitch assembly of claim 9 wherein the securing means is provided between the short extension and the long extension adjacent to the hitch bar.

12. In a hitch assembly of claim 9 wherein the securing means is a bolt extending through openings in the short extension and the long extension between the short extension and the long extension with a nut on the bolt for holding the bracket on the hitch bar.

* * * * *

UNITED STATES PATENT AND TRADEMARK OFFICE
CERTIFICATE OF CORRECTION

PATENT NO. : 5,288,094
DATED : February 22, 1994
INVENTOR(S) : Rex D. Putnam

It is certified that error appears in the above-indentified patent and that said Letters Patent is hereby corrected as shown below:

On the Title Page, under Item [56], "Woons" should be --Woods--.

Column 2, line 57, after "bolt" and before "extension", the following should be inserted --extending through openings in the short--.

Signed and Sealed this

Twelfth Day of July, 1994

Attest:

BRUCE LEHMAN

*Attesting Officer*    *Commissioner of Patents and Trademarks*